INVENTORS
Fritz Kugel and
Helmut Benz

May 1, 1945.   F. KUGEL ET AL   2,374,941
CONTROL DEVICE FOR THE FILLING OF TURBO TRANSMISSION CIRCUITS
Filed May 31, 1941   8 Sheets-Sheet 2

INVENTORS
Fritz Kugel and
Helmut Benz
BY  C. P. Goepel
their ATTORNEY

INVENTORS
Fritz Kugel and
Helmut Benz
BY C. P. Goepel
their ATTORNEY

INVENTORS
Fritz Kugel and
Helmut Benz
BY C. P. Goepel
their ATTORNEY

May 1, 1945. F. KUGEL ET AL 2,374,941
CONTROL DEVICE FOR THE FILLING OF TURBO TRANSMISSION CIRCUITS
Filed May 31, 1941 8 Sheets-Sheet 7

Fig. 12.

INVENTORS
Fritz Kugel and
Helmut Benz
BY C. P. Goepel
their ATTORNEY

Patented May 1, 1945

2,374,941

UNITED STATES PATENT OFFICE 2,374,941

CONTROL DEVICE FOR THE FILLING OF TURBOTRANSMISSION CIRCUITS

Fritz Kugel and Helmut Benz, Heidenheim-on-the-Brenz, Germany, assignors to American Voith Contact Co. Inc., New York, N. Y., a corporation of New York Application May 31, 1941, Serial No. 395,990
In Germany July 1, 1940

3 Claims. (Cl. 60—54)

This invention relates to turbotransmissions, one or more circuits of which start operation by being filled with fluid and stop operation by being emptied. Vehicles which are equipped with such turbotransmissions require a rapid filling of circuits for starting as well as for changing from one circuit to the other. Transmissions which need this feature are therefore equipped with a filling device which supplies an exceptionally large amount of fluid for the filling but allows at the same time a reduced amount of fluid to act to keep the circuit only so filled as to avoid load losses and the generation of heat.

The invention then consists of a combination of a sump for the collection of fluid, a pump for supplying fluid from the sump, a reservoir disposed above the sump, transmission circuits disposed below the reservoir and above the sump, and a control member disposed between the circuits and the pump, the control member having means to direct the fluid to a circuit to compensate for its leakage, and having means to receive fluid from a circuit being emptied, and having means for directing a supply of fluid in larger quantity than the quantity for the leakage compensation to immediately and quickly fill the circuit to be filled.

The invention has the advantage in comparison to known devices that the control fluid for the filling device need not be controlled by a special measuring device, such as a manometer or an oil brake used as a time measuring device, thus eliminating any fouling caused by breakdowns of these instruments. In the present invention the control depends upon the emptying of a circuit. As far as additional control measures are necessary they are made part of the main control piston which works continuously during the working period.

The figures show several examples of the designs of the control according to the invention.

Figure 1:
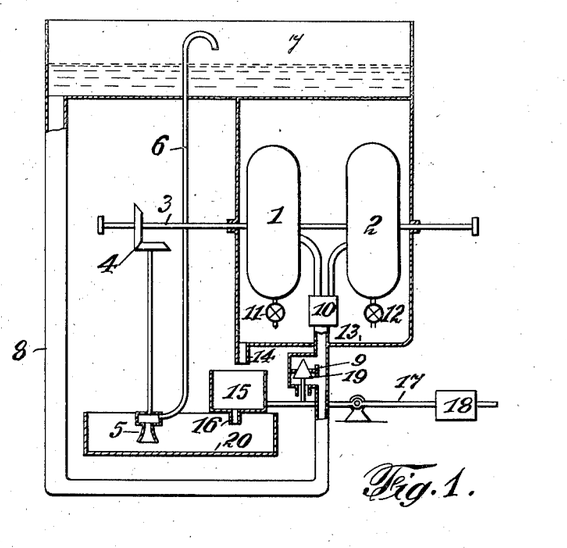
Figure 1 shows diagrammatically a turbotransmission with elevated storage tank, the fluid of which running out of a circuit operates a valve with the aid of a balance.

In Fig. 1, reference numerals 1 and 2 signify two circuits of a turbotransmission, 3 the main drive shaft and 4 a bevel wheel pair for the drive of the pump 5. This pump continuously delivers to the tank 7 the fluid which escapes out of the circuits and collects in the collecting tank 20. This tank may be arranged above the circuits, so that the fluid flows to the circuits through the conduit 8 by gravity. During operation of a circuit only the port 9 is free for the passage of the fluid. The fluid is fed by the main control valve 10 to one or the other circuit. 11 and 12 designate controlled discharge ports of the circuit. The fluid which leaves by leaking during the operation and by changing the speed, passes through the discharge ports 11 and 12, accumulates in the sump 13, and flows through the port 14 to the weighing vessel 15. This has a discharge port 16 by which the fluid flows to the collecting tank 20. The two ports 14 and 16 are so positioned in relation to each other that in normal operation the small quantity of fluid which escapes by leakage flows without obstruction into the weighing vessel 15. The port 16 is smaller than the port 14, but permits the normal leakage to flow through both the ports 14 and 16, into tank 20 without actuating the balance beam 17. However, during the emptying of one of the circuits a larger quantity of fluid enters the vessel and being heavier than the counterweight 18 tips the balance beam 17 and lowers the valve cone 19. Thereupon a larger port, opened by the valve 19 in addition to the port 9 is made available for the passage of the fluid from the tank 7 to the main control valve 10. This port remains open until the fluid has almost completely escaped through the port 16, whereupon the counterweight 18 brings the balance to its original position and the valve 19 is closed again. The port 16 and the valve port 19 must be in such relation to each other that the circuit being filled will be completely filled in the time needed to empty the other circuit.

Figure 2:
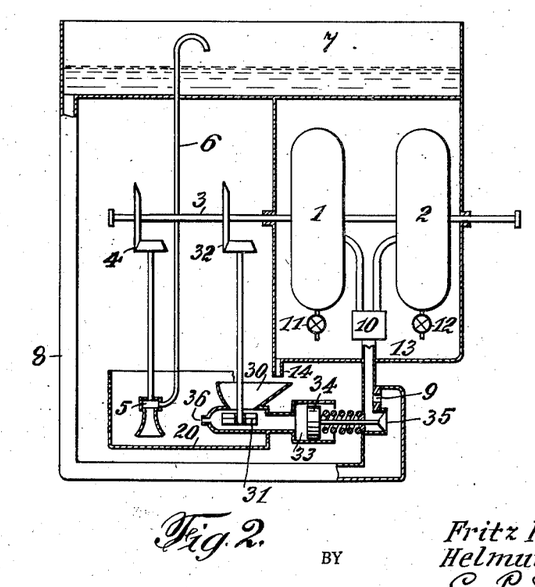
Figure 2 shows diagrammatically a transmission of the same design, the running-out fluid of which is brought under pressure by an impeller wheel and controls a valve with the aid of a spring-loaded piston.

Fig. 2 illustrates a transmission with a somewhat similar arrangement. The fluid flowing from the sump 13 runs through the port 14 into a collecting funnel 30 and from there to an impeller wheel 31. This wheel is also driven by the mainshaft 3 by means of a pair of bevel gears 32. The fluid is brought under pressure by this impeller wheel and actuates piston 34 in the auxiliary cylinder 33. The piston moves valve cone 35. An auxiliary escape port 36 is provided and dimensioned to allow the leakage fluid to escape without influencing the valve 35. The funnel 30 is filled when one of the circuits is emptied, the pump 31 then generating its full pressure whereby the valve 35 is opened. When after the emptying of one of the circuits, the funnel 30 is drained of its fluid through the port 36, the pressure ceases in the cylinder 33 and the valve 35 is again closed by its spring.

Figure 3:
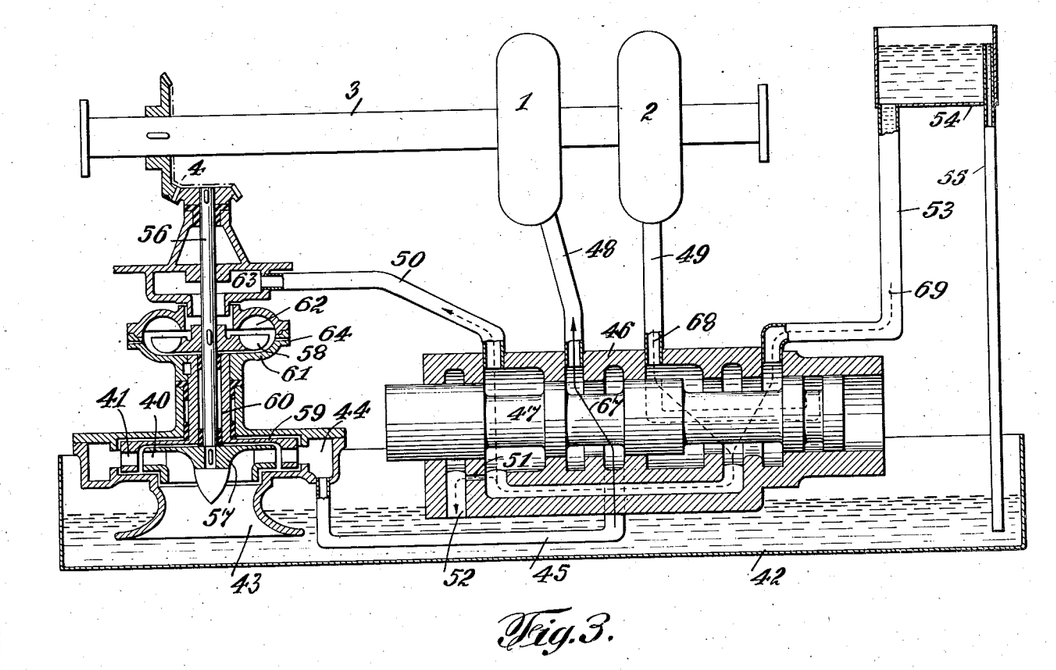
Figure 3 shows a central section through the main control valve and a transmission with a storage tank arranged in low position and a filling pump with two blade wheels as well as a secondary tank for idling.

Fig. 3 portrays an arrangement of the invention with the fluid tank in low position. The two circuits 1 and 2 are formed with stationary casings. A pump provided with two separate blade wheels 40 and 41 is driven by the bevel gear pair 4 by the main shaft 3. This pump sucks the fluid from the tank 42 by the inlet 43 and supplies it by the spiral passage 44 and the pipe 45 to the main control valve 46. 47 designates the piston of the main control valve, 48 the connecting line to the circuit 1, 49 the connecting line to the circuit 2. The line 50 forms an inlet pipe to the pump. The line 50 leads from a chamber in valve 46 also connected with the escape port 52 through the throttling device 51. Pipe 53 leads to an auxiliary tank 54, the highest fluid level of which is fixed by overflow pipe 55. The wheel 57 of the pump with its blade wheel 40 is driven by the pair of bevel wheels 4 through shaft 56. The driving half 58 of a small turbocoupling is also fixed to the shaft 56. The blade wheel 41 is connected with the driven half 62 of this turbocoupling through disc 59, hollow shaft 60 and coupling casing 61. The fluid for filling this turbocoupling is supplied through ring channel 63 by the pipe 50. At the outer circumference of the coupling casing 61 are arranged outlet ports 64, which are either continually open or automatically controllable.

This arrangement works so that when changing gears, i. e., when changing from the circuit 1 to the circuit 2 or vice versa, or when starting one of the two circuits from idling position—operating fluid is supplied by the conduit 50 and the ring channel 63 to the turbocoupling 58, 62, until the contents of the circuit (1 or 2 or the auxiliary tank 54 respectively) to be emptied has been evacuated partly through the throttling device 51 and partly through the outlet ports 64. The filling of the coupling 58, 62 has the effect, that in addition to the continuously running blade wheel 40, the blade wheel 41 is also impelled, and thus the conduit 45 receives suddenly a greater quantity of fluid which fills completely the circuit being supplied. After such circuit has been filled, a smaller quantity of fluid is needed to replace leakage, and this quantity is supplied by the blade wheel 40. The filling time may be regulated by the throttling device 51, as according to its adjustment more or less of the escaping fluid must pass through the coupling 58, 62 and accordingly the blade wheel 41 is actuated a shorter or longer time. The auxiliary tank 54 serves for the starting of one of the two circuits from idling position as no other fluid volume accumulates during idling. It is not necessary when shifting from one of the two circuits to idling position to fill the coupling 58, 62; the throttling device is bypassed then by the control piston 47, so that the escaping fluid runs quickly away without entering the conduit.

Figure 4:
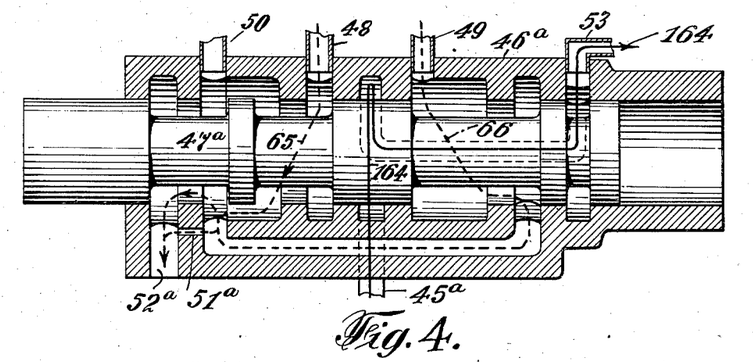
Figs. 4 and 5 show in enlarged central sections two different positions of the main control valve of Figure 3.
Figure 5:
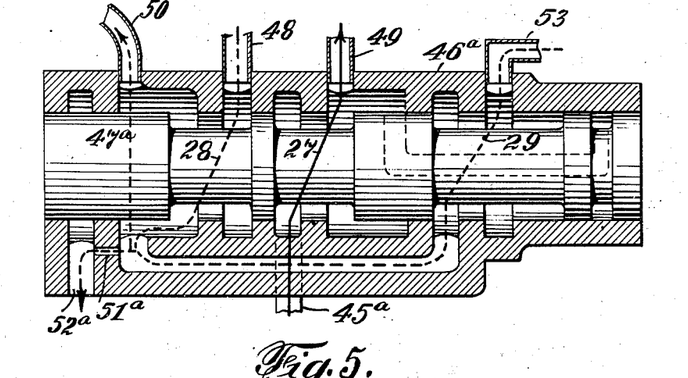

Different positions of the control piston 47 are shown in Figs. 3 to 5 to illustrate the working method. The idling position corresponds to Figure 4. In this position the flow from the supply conduit 45 to the circuits is interrupted. The fluid flows now from 45 in the direction of the arrow 164 to the conduit 53 and to the auxiliary tank 54; as soon as this tank is filled the fluid flows back through the overflow pipe 55 to the tank 42. The empting fluid which runs out of the circuit 1 through the conduit 48 when changing gear, as shown by the arrow 65, may flow freely to the escape conduit 52 and is not forced through the conduit 50. The same free flow occurs when the fluid flows in direction of arrow 66 when emptying the circuit 2.

In Fig. 3 the position of the control piston 47 is shown for the filling operation of circuit 1. In this case the fluid flows from the supply line 45 in the direction of the arrow 67 to the conduit 48 and to the circuit 1. The fluid in the control valve may escape now only through the throttling device 51. If the circuit 2 has been filled before and now empties, the fluid flows out of conduit 49 in the direction of the arrow 68 to the conduit 50. When the circuit 1 has been started from idling position, the fluid flows in direction of arrow 69. When the circuit 2 or the auxiliary tank 54 respectively has been emptied, the flow through conduit 50 ceases and the coupling 58, 62 empties itself through the ports 64. To lead away the eventually occurring leakages the port 51 is sufficient and no more fluid flows to the conduit 50.

Fig. 5 shows the position of the control piston 47 for filling the circuit 2. From the supply line 45 the fluid flows in direction of arrow 27 to the conduit 49. The fluid is supplied to conduit 50 in direction of arrow 28 or arrow 29, depending on whether the circuit 1 is then in operation or idling.

Figure 6:
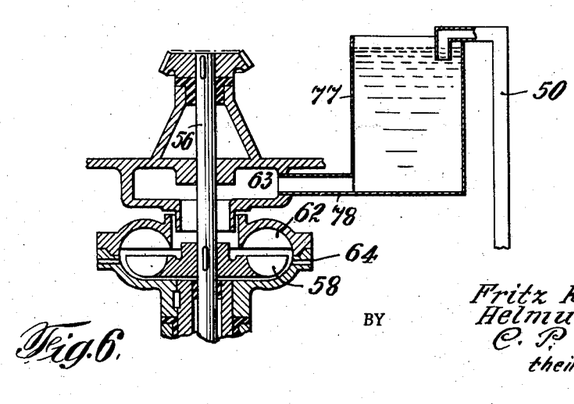
Figure 6 shows diagrammatically an alternative arrangement with an intermediate tank in front of the filling device.

In Fig. 6 the use of an intermediate tank is shown. The conduit 50 (see Fig. 3) leads in this case not directly to the pump but first to the intermediate tank 77. This tank is emptied by the conduit 78 into the ring channel 63 as quickly as the outlet ports 64 allow. Accordingly, the emptying time for the circuit to be put out of operation may be shortened.

Figure 7:
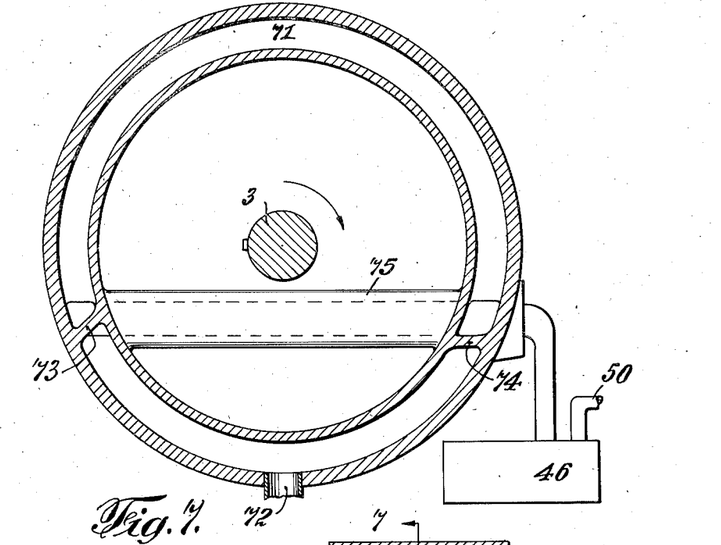
Fig. 7 shows a detail section taken substantially on the line 7—7 of Fig. 8.
Figure 8:
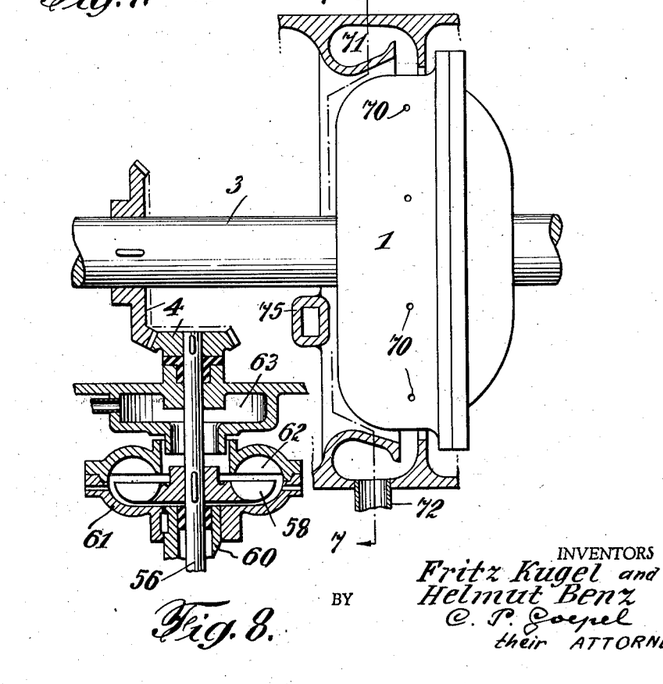
Figure 8 shows diagrammatically an arrangement of a save-all gutter for the fluid supply to the filling device.

In the control shown in Figures 3 to 5 both circuits have stationary casings. But where it is not feasible to design one of the turbo circuits with a stationary casing, the arrangements according to Figs. 7 and 8 may be used. With such circuits the fluid escaping through the outlet ports 70 at the circumference is accumulated in a save-all gutter 71 to avoid unnecessary vaporizing of the fluid. The save-all gutter is divided by walls 73, 74 and a channel 75 supplies the fluid from the upper part of the save-all gutter to the main control valve 46. As in this embodiment the transmission is so disposed that its lower part is below the level of the control valve, and hence the fluid from the opening 72 cannot enter by gravity the control 46, the transmission is provided with the said partitions or walls 73, 74 below ports which are connected by the channel 75, which in turn guides the fluid of the upper part of the transmission by gravity to the control 46. The fluid passing out of 72, may drain into a tank such as the tank 42 of Figure 3. In Figure 3 the fluid draining out of the port 64 of the transmission 58, 62 drops by gravity into tank 42. The other reference numerals in Figs. 7 and 8 correspond to the numerals in Figure 3.

Figure 9:
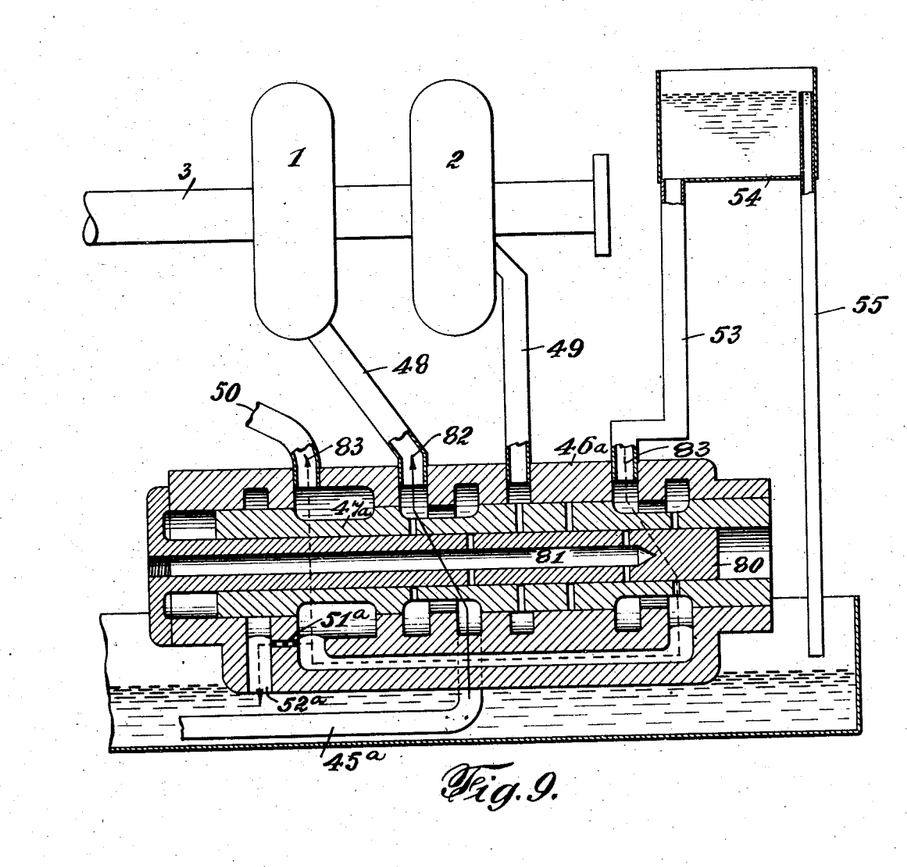
Figure 9 shows diagrammatically the arrangement of a control, one auxiliary tank of which is filled during idling as well as during operation of one circuit.
Figure 10:
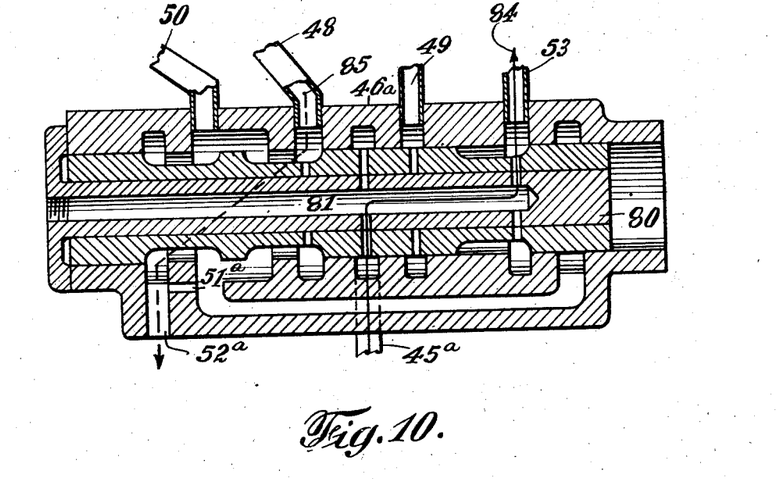
Figures 10 and 11 show in enlarged central sections two positions of the main control valve of Figure 9.
Figure 11:
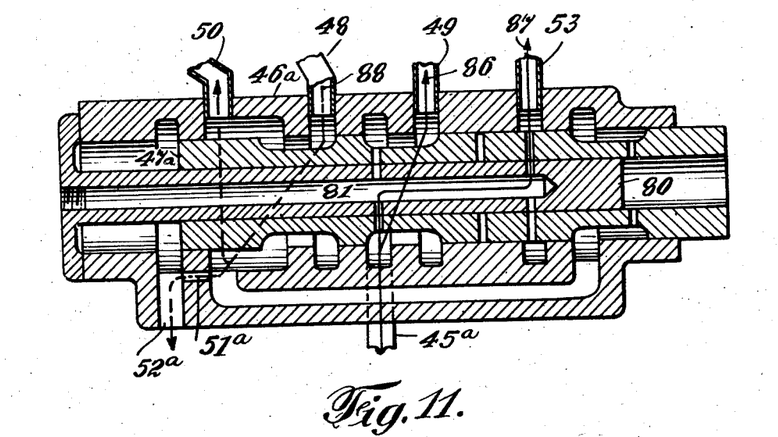

Figures 9 to 11 show another arrangement of the main control valve 46 which is constructed for a transmission with a circuit 1 with stationary casing whereas the arrangement of the other circuit 2 is supposed to be unable to catch the escaping fluid. The pump for this arrangement has to be completed according to Figure 3. In this case the auxiliary tank 54 enters into action as well when idling as during operation of the circuit 2. The control valve 47a is of hollow construction. Its bore receives the stationary piston 80 with the bore 81, and cross channels in the piston 80 allow the passing of the fluid for filling the auxiliary tank 54. During operation of the circuit 1 (Fig. 9) the fluid flows from the supply conduit 45a in the direction of the arrow 82 to the conduit 48. Regardless of whether the circuit 2 was idle or in earlier operation, the fluid tank 54 empties in the direction of the arrow 83 through the throttling device 51a and the conduit 50, the pump shown in Fig. 3 operating until the auxiliary tank 54 has become empty. During idling (Fig. 10) the auxiliary tank is filled in direction of arrow 84 and the conduit 48 has a free outlet to the escape conduit 52a in the direction of arrow 85. During operation of the circuit 2 (Fig. 11) this circuit is filled through the conduit 49 in the direction of arrow 86 and at the same time in the direction of the arrow 87 the auxiliary tank 54 is filled through the conduit 53. The dimensioning of the cross channels in piston 80 allows the regulation of the fluid flowing to the two branches. The circuit 1, if in earlier operation, empties in the direction of the arrow 88 through the throttling device 51.

Figure 12:
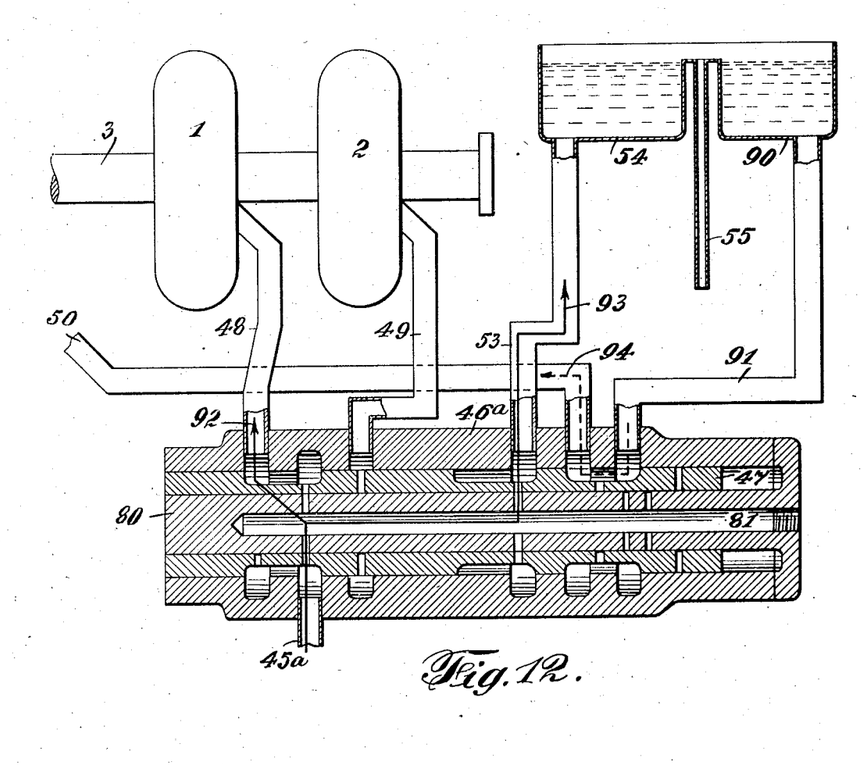
Figure 12 shows diagrammatically the arrangement of a control with two auxiliary tanks.
Figure 13:
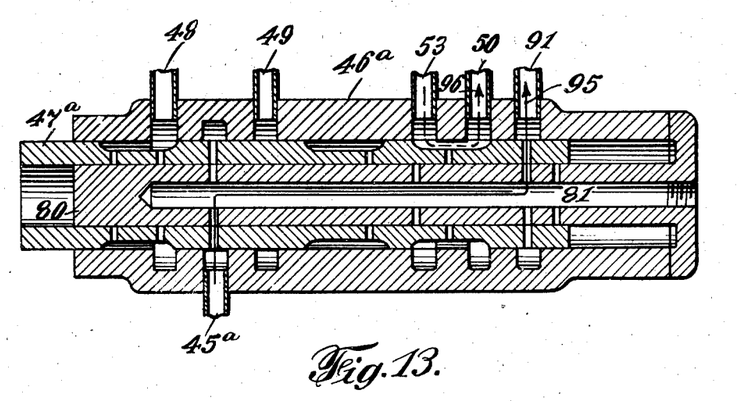
Figures 13 and 14 show in enlarged central sections two positions of the main control valve of Figure 12.
Figure 14:
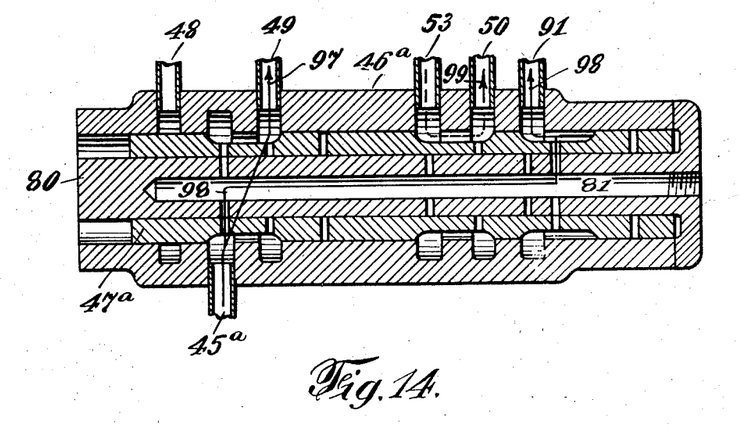

Another arrangement of the invention is shown in Figures 12 to 14, for use when the fluid contents of the two circuits cannot be conducted to the pump for some reason. In this case two auxiliary tanks are arranged, one of which 54 is filled during the operation of circuit 1, the other 90 during idling and during operation of circuit 2. Thus the tank 54 is emptied at each change of gear when changing from circuit 1 to circuit 2, or from circuit 1 back to neutral, and the tank 90 is emptied at each change of gear when changing from circuit 2 to circuit 1 or from neutral to circuit 1. In Figure 12 the control valve is shown in position for the first speed, in Figure 13 for neutral, and in Figure 14 for the second speed. The arrows 92 to 99 inclusive indicate the direction of the fluid in the different operations. 91 is a conduit to the auxiliary tank 90. The overflow conduit 55 may be used for both auxiliary tanks.

Reference is made to the U. S. Patent to Faic Canaan, No. 2,083,828, of June 15, 1937, of which this invention is an improvement.

From the foregoing it is believed that the construction and advantages of the invention may be readily understood by those skilled in the art without further description, it being borne in mind that numerous changes may be made in the details disclosed without departing from the spirit of the invention as set out in the following claims.

We claim:

1. A control appliance for a filling device for turbotransmission circuits having a pair of circuits both of which may be emptied, or either of which may be filled while the other is emptying, which start operation by being filled with fluid and stop operation by being emptied of fluid, comprising a reservoir for the fluid, a sump for the fluid, a pump in said sump having means for directing a quantity of fluid to a circuit for keeping the circuit filled, and having additional means for directing a larger quantity of fluid to the circuit for the filling of that circuit, and a valved control member having means for receiving fluid from said reservoir and from a circuit being emptied and directing it to said additional means to set it in operation and having means directing the larger quantity of fluid from the pump to the circuit being filled and directing the smaller quantity of fluid to the circuit when filled, and also having throttle means discharging fluid in the control member to the sump, said fluid coming from the circuit being emptied and from the reservoir when any circuit is emptied, the time of discharge of fluid through the throttle means determining the time the fluid in the control member can actuate the said additional means, all of said valve connections being made while the valve is in one position.

2. A control appliance for a filling device for turbotransmission circuits having a pair of circuits both of which may be emptied, or either of which may be filled while the other is emptying, which start operation by being filled with fluid and stop operation by being emptied of fluid, comprising a reservoir for the fluid, a sump for the fluid, a pump in the sump having means for directing a larger quantity of the fluid to the circuit to be filled and means for directing a smaller quantity of fluid to the filled circuit for keeping the circuit filled, means for operating said pump to feed said smaller quantity of fluid to said circuit, and a control member having a movable valve and interposed between the pump and the circuits, and below the reservoir and above the sump, having means to receive the fluid from the pump and direct it to the circuit to be filled and to the circuit when filled, and having means to receive the fluid from the circuit being emptied and from the reservoir, and having means for guiding the emptying fluid from the circuit and from the reservoir to the pump to set in operation the means for directing the larger quantity of fluid for filling the circuit, whereby a smaller quantity of fluid is supplied for keeping the circuit filled and a larger quantity is supplied for the filling of the circuit, and also having throttle means discharging fluid in the control member to the sump, said fluid coming from the circuit being emptied and from the reservoir when any circuit is emptied, the time of discharge of fluid through the throttle means determining the time the fluid in the control member can actuate the said additional means, all of said valve connections being made while the valve is in one position.

3. A control appliance for a filling device for turbotransmission circuits having a pair of circuits both of which may be emptied, or either of which may be filled while the other is emptying, which start operation by being filled with fluid and stop operation by being emptied of fluid, comprising a reservoir for the fluid, a sump for the fluid, a pump in the sump having means for directing a larger quantity of the fluid to the circuit to be filled and means for directing a smaller quantity of fluid to the filled circuit for keeping the circuit filled, means for operating said pump to feed said smaller quantity of fluid to said circuit, and a control member having a movable valve and interposed between the pump and the circuits, and below the reservoir and above the sump, having means to receive the fluid from the pump and direct it to the circuit to be filled and to the circuit when filled, and having means to receive the fluid from the circuit being emptied and from the reservoir, and having means for guiding the emptying fluid from the circuit and from the reservoir to the pump to set in operation the means for directing the larger quantity of fluid for filling the circuit, all of said means of said control member being operative when the valve is in one position, and having means to provide a direct communication from the pump to the reservoir and to discharge the fluid from the circuits to the sump when emptying to idle the circuits without said discharging fluid actuating the pump means for supplying the larger quantity of fluid when the valve is in another position, and also having throttle means discharging fluid in the control member to the sump, said fluid coming from the circuit being emptied and from the reservoir when any circuit is emptied, the time of discharge of fluid through the throttle means determining the time the fluid in the control member can actuate the said additional means, when the valve is in said one position.

FRITZ KUGEL.
HELMUT BENZ.